(12) United States Patent
Lin

(10) Patent No.: US 6,478,581 B1
(45) Date of Patent: Nov. 12, 2002

(54) EXTERNAL METHOD FOR EMPLOYING CNDU IN TRAINER SYSTEM

(75) Inventor: Ching-Fang Lin, Chatsworth, CA (US)

(73) Assignee: American GNC Corporation, Simi Valley, CA (US)

( * ) Notice: Subject to any disclaimer, the term of this patent is extended or adjusted under 35 U.S.C. 154(b) by 0 days.

(21) Appl. No.: 09/560,107

(22) Filed: Apr. 28, 2000

Related U.S. Application Data

(60) Provisional application No. 60/137,878, filed on Jun. 7, 1999.

(51) Int. Cl.$^7$ .................................................. G09B 9/08
(52) U.S. Cl. .......................................... 434/30; 434/35
(58) Field of Search .......................... 434/29, 30, 33, 434/34, 35; 345/952

(56) References Cited

U.S. PATENT DOCUMENTS 5,218,547 A * 6/1993 Tebbs ........................... 701/14
6,319,008 B1 * 11/2001 Mickelson et al. ........... 434/29

FOREIGN PATENT DOCUMENTS

EP            807882 A2 * 11/1997  ............ G06F/9/455

* cited by examiner

*Primary Examiner*—John Edmund Rovnak
(74) *Attorney, Agent, or Firm*—Raymond Y. Chan; David & Raymond Patent Group

(57) ABSTRACT

An external method for addressing the trainer-unique functions in a flight training system allows a Control Display Navigation Unit (CDNU), loaded with an actual Operational Flight Program (OFP), to function properly in a Flight Simulator environment of a trainer system without sacrificing the trainer-unique functions. A CDNU Trainer Interface Unit (CTIU) is defined to realize the external method. The CTIU is installed between the CDNU and the trainer system. The communication between the CDNU with an OFP and the trainer system is thus controlled by the CTIU. The trainer-unique functions are controlled externally by the CTIU, thus eliminating an OTP in the CDNU. The CTIU connects the CDNU and the trainer system. It communicates with both the trainer system and the CDNU/OFP using two sets of MIL-STD-1553B Buses. To the CDNU/OFP, it acts like the real navigation and communication systems. To the trainer system, it acts like a CDNU OTP. The CTIU will be able to address the trainer-unique functions with no modification to the OFP and CDNU hardware. The functions of the Operational Training Program (OTP) will be realized by the CTIU external to the CDNU/OFP. The CTIU activates OTP-equivalent capabilities upon receipt of OTP active commands from the trainer system.

53 Claims, 9 Drawing Sheets

US 6,478,581 B1

EXTERNAL METHOD FOR EMPLOYING CNDU IN TRAINER SYSTEM

CROSS REFERENCE OF RELATED APPLICATION

This is a regular application of a provisional application having an application number of No. 60/137,878 and a filing date of Jun. 7, 1999.

This invention was made with Government support under Contract No. N61339-01-C-0005 awarded by the Navel Air Warfare Center Training Systems Division, 12350 Research Parkway, Orlando, Fla. 32826-3224. The Government has certain rights in the invention.

TECHNICAL FIELD

FIELD OF THE PRESENT INVENTION

The present invention relates to an external method for employing control display navigation unit (CDNU) in trainer system, which allows a CDNU, loaded with an actual Operational Flight Program (OFP), to function properly in a flight simulator environment of a trainer system without sacrificing the trainer-unique functions that are unique to the flight simulator operation.

BACKGROUND OF THE PRESENT INVENTION

This invention provides a method to apply a CDNU (control display navigation unit) in a flight simulator environment provided by a trainer system. Originally, the CDNU with an operational flight program OFP was used in the aircraft to control the navigation and communication equipment. Usually, to use the CDNU in the trainer system, the OFP must be modified to an operational trainer program OTP in order to address the trainer-unique functions. The OFP modification or the development of an OTP for each version of each platform is an arduous and costly job.

FIG. 2 depicts the CDNU application in the real flight environment. In the aircraft, the CDNUs 11, 12 are used to control the real navigation and communication equipment. The CDNUs 11, 12 reduce aircraft complexity through integrated control of navigation, communications, and other avionics equipment using a multiplex data bus. The CDNU provides centralized control of all interfaced avionics systems 40.

The software loaded into the CDNU defines its function. The program that is loaded into the unit during manufacture or in the field is referred to as Operational Flight Program (OFP). This software program determines the function of the CDNU. Multiplex data bus messages are defined by the OFP to transmit data between the CDNU and the real avionics equipment 40.

FIG. 3 depicts the CDNU used in the trainer system 30. In the trainer system 30, the navigation and communication equipment is emulated by the simulation computer. The CDNUs 11, 12 are connected to the simulation computer through the multiplex data bus. The actual CDNU is used in the simulator in order to take advantage of the CDNU processing capability. However, a problem arises in the flight simulator, because the system is not in a real flight. Since the CDNU software is designed to operate in the real aircraft environment, several anomalies occur when it is used in the flight simulator environment. The CDNUs 11, 12 can not adapt to some of the trainer-unique functions, such as initialization/reset, freeze, run, slew, snapshot and present position calculation, which are unique to the flight simulator operation. During execution of the trainer-unique functions, the simulator stops emulating the real avionics equipment and requesting extra information from the CDNUs. The CDNU/OFP cannot handle these situations. Modification of the OFP is therefore required. The OFP is modified to an Operational Training Program (OTP) that can address the trainer-unique functions and a set of multiplex data bus messages are defined by the OTP to transmit data between the CDNUs 11, 12 and the trainer system 30 during the trainer-unique functions.

As an example, let us discuss a situation to address a trainer-unique function, Snapshot. In the helicopter training, the pilot is often required to repeat a specific training period or the instructor needs to show a specific period that the pilot has experienced for instruction purpose. To realize this function, all the state data and the training system experience must be saved for later use. A CDNU/OFP does not have this function. During the repeated training, the CDNU also needs to show the repeated process to the pilot.

Each aircraft platform that uses the CDNU has aircraft-specific software installed in that CDNU—the Operational Flight Program (OFP). Currently, each OFP is being modified for each flight simulator, on a case-by-case basis, to address trainer-unique functions. The present training simulator is implemented using the CDNU OTP integrated into the CDNU/OFP of each aircraft to provide the functionality to recognize an external computer that is used for aircrew training. The modification of the OFP for each flight simulator is a tedious and costly job, and must be repeated each time the OFP design changes. In summary, the problems of the existing OTP include the following.

1. OFP needs to be modified to function as the OTP.
2. OFP needs to be modified for each type of aircraft. Therefore each simulator needs a different OTP.
3. Each time the version of OFP changes, the corresponding OTP must be modified. It is costly and laborious.

SUMMARY OF THE PRESENT INVENTION

It is an objective of the present invention to provide an external method for employing CDNU in trainer system that allows the CDNU, loaded with OFP, to function properly in a simulator environment and provide the trainer-unique functions.

It is another objective of the present invention to provide a CDNU Trainer Interface Unit (CTWU) adapted to connect between the CDNU and the trainer system for processing the external method for employing CDNU in trainer system so as to allow the CDNU/OFP to function properly in a flight simulator environment and provide the trainer-unique functions.

It is another objective of the present invention to provide an external method for employing CDNU in trainer system by connecting the CTIU between the CDNU and the trainer system, wherein the CTIU can be implemented by commercial-off-the-shelf (COTS) modules based on an open standard bus structure.

It is a further objective of the present invention to provide a CTIU which uses OFP and OTP pre-defined multiplex data bus messages to communicate with the CDNU/OFP and the trainer system respectively.

It is a further objective of the present invention to provide a CTIU which must provide functions to simulate real avionics equipment with respect to the CDNU/OFP.

It is a further objective of the present invention to provide a CTIU which must provide functions to simulate a CDNU with OTP with respect to the trainer system.

It is, a further objective of the present invention to provide an external method for employing CDNU in trainer system, wherein during normal simulation mode, the CTIU acts as a message relay between the CDNU/OFP and trainer system.

It is a further objective of the present invention to provide a CTIU that can provide proper data for both the CDNU/OFP and the trainer system during the trainer-unique functions.

It is another objective of the present invention to provide a CTIU which comprises a computer with two pairs of multiplex data bus controllers. It is serially integrated between the CDNU and the remaining trainer system. The CTIU will communicate with both the trainer system and the CDNU/OFP. With CTIU, there is no need to modify the OFP to address the trainer unique functions. The functions of the Operational Training Program (OTP) will be realized by the CTIU to the CDNU. The CTIU activates OTP-equivalent capabilities upon receipt of OTP active commands from the trainer system. The trainer-unique functions will be performed by the CITU to the CDNU. There will be no need to modify the OFP and/or integrate OTP functions into the CDNU.

It is also an objective of the present invention to provide a CTIU connected between the CDNU and the trainer system. The CTIU communicates with both the trainer system and the CDNU/OFP, using two sets of multiplex data buses. To the CDNU/OFP, the CTIU acts like the real navigation and communication systems. To the trainer system, the CTIU acts like a CDNU with OTP. The CTIU will be able to address the trainer-unique functions with no modification to the OFP and CDNU hardware. The functions of the Operational Training Program (OTP) will be realized by the CTIU to the CDNU/OFP. The CTIU activates OTP-equivalent capabilities upon receipt of OTP active commands from the trainer system.

In order to replace the trainer-unique functions realized by the CDNU with OTP, the CDNU Trainer Interface Unit must emulate the trainer-unique functions in two directions:

(1) With respect to the trainer system, the CTIU must transfer all the data required by the trainer system during the trainer-unique functions, acting like a CDNU with OTP.

(2) With respect to the CDNU/OFP, the CTIU must act like the real navigation and communication equipment. During the normal simulation mode, the navigation and communication equipment is simulated by the trainer system. The Interface Unit connects between the CDNU/OFP and trainer system and relays the simulated messages from the trainer system. During the trainer-unique function mode, the CTIU must provide the data required by the CDNU/OFP.

(3) With respect to the pilots, the CDNU/OFP must allow them to deal with the Trainer-unique operations, under the control of the CTIU.

DETAILED DESCRIPTION OF THE PREFERRING EMBODIMENT

Figure 1:
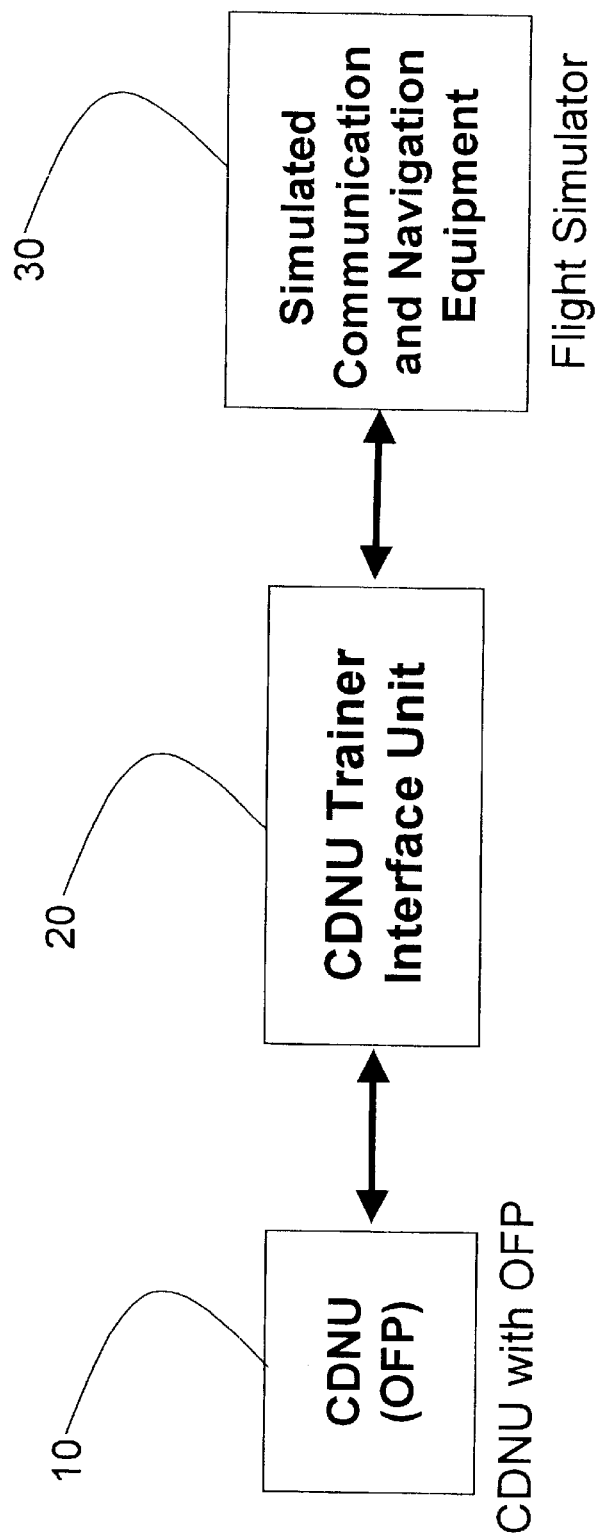
FIG. 1 is a block diagram illustrating a CDNU Trainer Interface Unit (CTIU) applied in the simulation trainer system.
Figure 2:
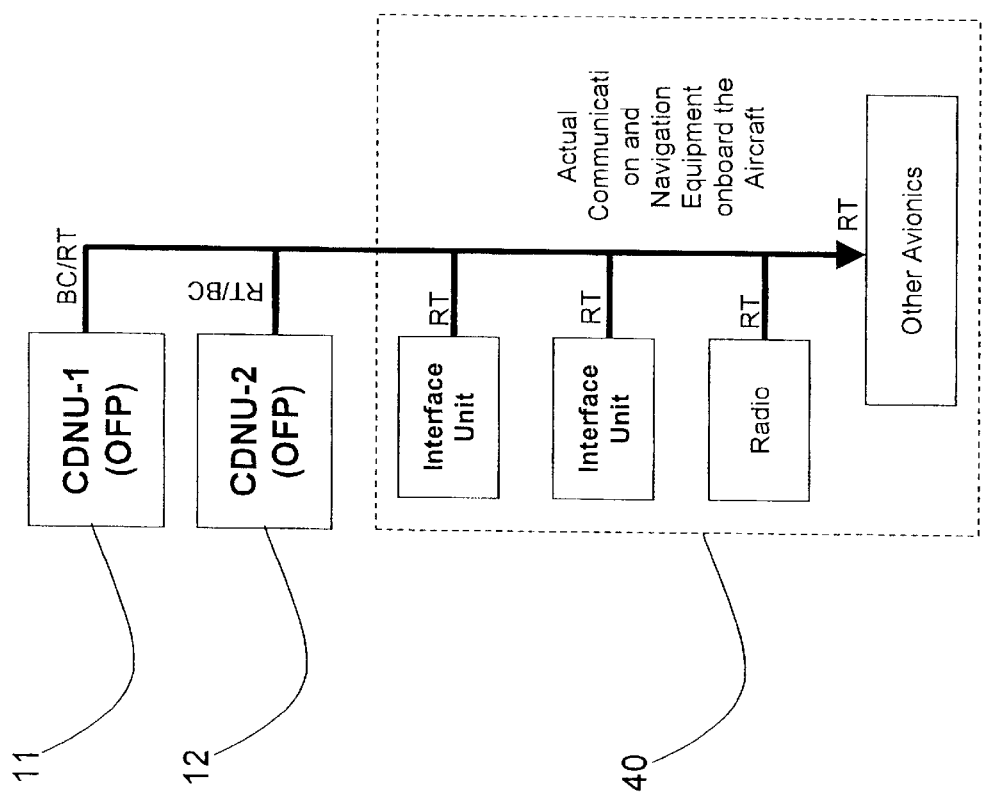
FIG. 2 is a block diagram illustrating a CDNU in the real flight environment.
Figure 3:
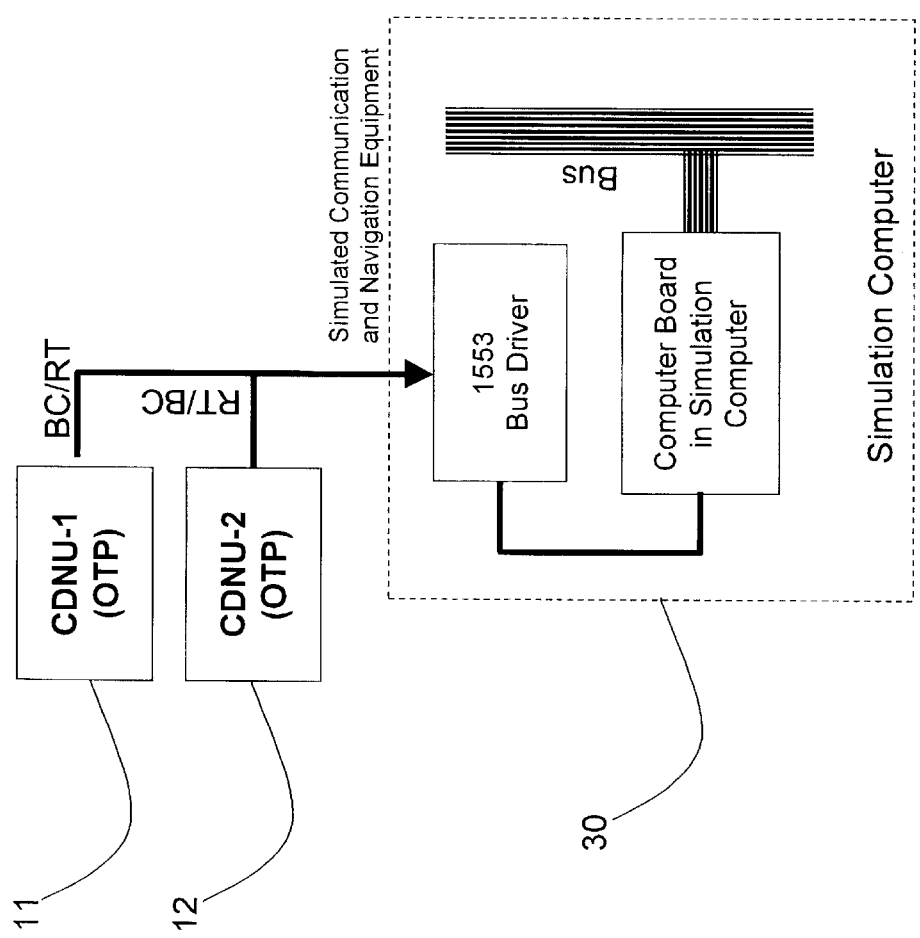
FIG. 3 is a block diagram illustrating a CDNU with OTP in the trainer system environment of the trainer system.
Figure 4:
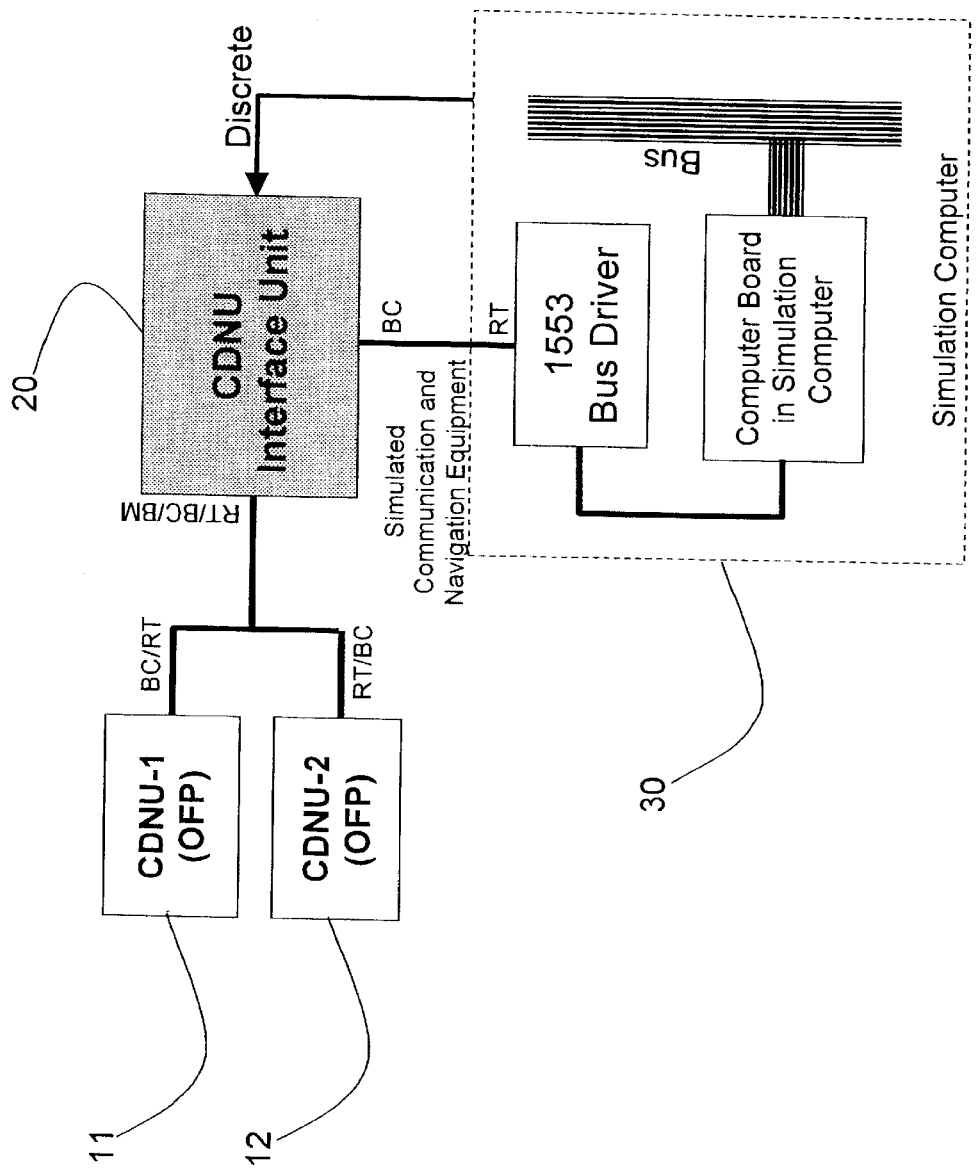
FIG. 4 is a block diagram illustrating the CTIU in the trainer system.
Figure 5:
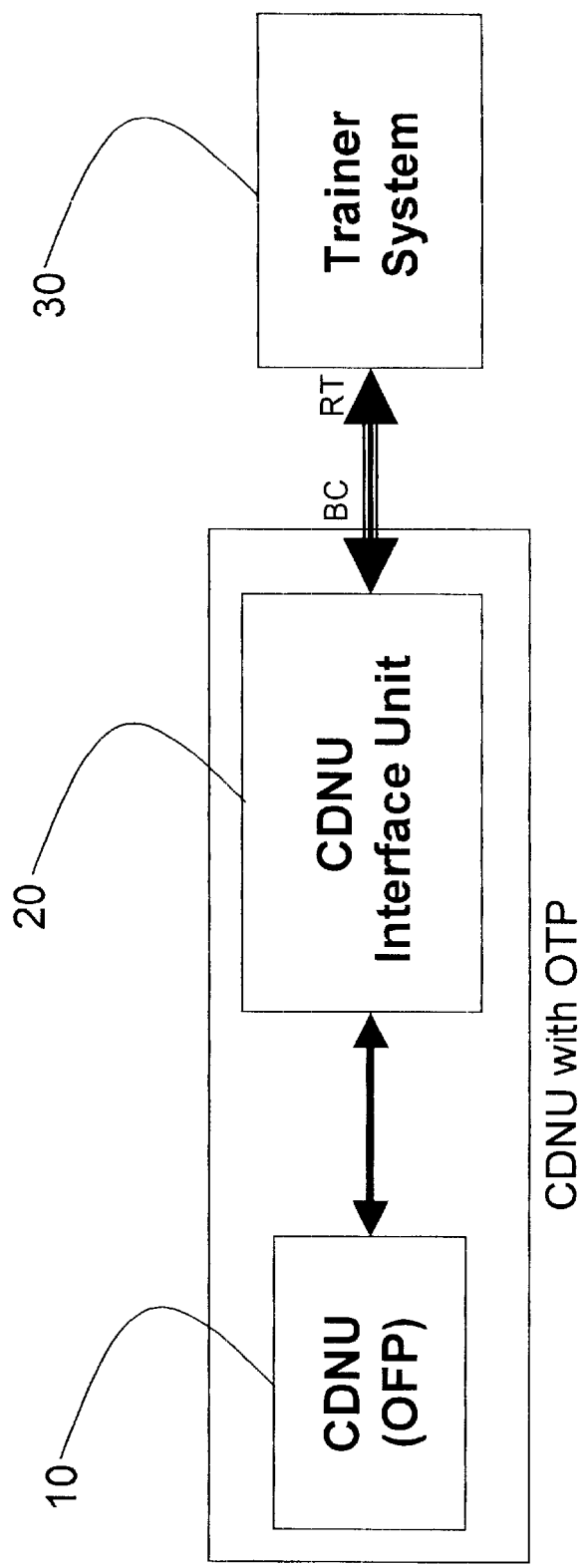
FIG. 5 is a block diagram illustrating the interfaces and communication of CTIU with respect to the trainer system.
Figure 6:
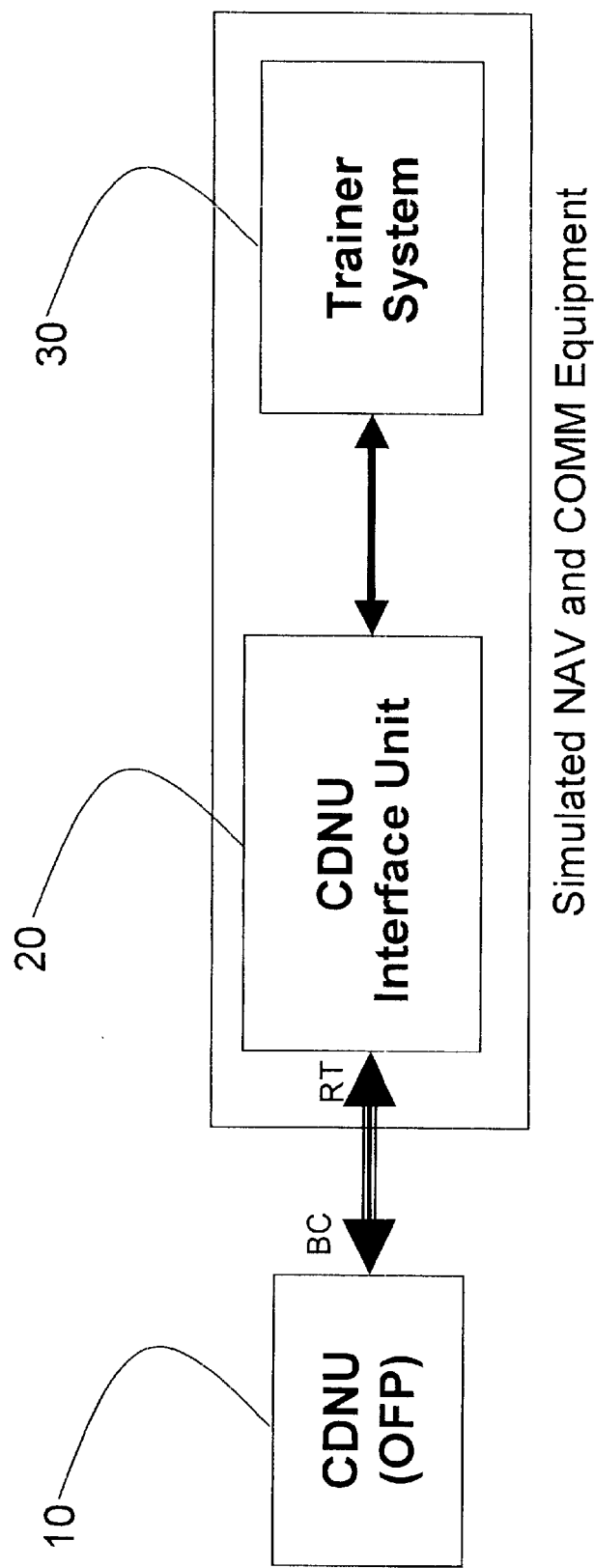
FIG. 6 is a block diagram illustrating the interfaces and communication of CTIU with respect to the CDNU.

Referring to FIG. 1, the present invention provides an external method for employing control display navigation unit 10 in a trainer system 30, which is an innovative approach to address the trainer-unique functions externally to a control display navigation unit (CDNU) which is employed with an actual operational flight program (OFP). The CDNU with OFP 10 can be directly integrated into the trainer system 30 without modification.

The present invention resolves the problems of applying a Control Display Navigation Unit (CDNU) in a flight simulator (trainer system) environment. Originally, the CDNU 10 with an Operational Flight Program (OFP) was used in the aircraft to control the navigation and communication equipment. To use the CDNU 10 in the trainer system, the OFP must be modified to an Operational Training Program (OTP) in order to address the trainer-unique functions. The OFP modification and/or the development of an OTP for each version of each platform are arduous and costly jobs. Therefore, in the present invention, an external method is developed to address the trainer-unique functions externally to the CDNU 10, thus the CDNU with OFP 10 can be directly integrated into the trainer system 30 without modification. The cost of modification of the OFP and/or development of an OTP is thus eliminated. This external method can address the trainer-unique functions, including initialization/reset, freeze, run, slew, snapshot and present position calculation. These functions are unique to the flight simulator operation.

A CDNU Trainer Interface Unit (CTIU) 20 is developed to process the external method. The CTIU 20 connects the CDNU 10 and the trainer system. It communicates with both the simulation computer of the trainer system 30 and the CDNU/OFP 10 by means of two sets of multiplex data buses 211, 221, preferably MIL-STD-1553B buses. To the CDNU/OFP 10, it acts like the real navigation and communication systems. To the trainer system, it acts like a CDNU 10 with operational training program (OTP). The CTIU 20 will be able to address the trainer-unique functions with no modification to the OFP and CDNU hardware. The OTP functions will be realized by the CTIU 20 externally to the CDNU/OFP. The CTIU 20 activates OTP-equivalent capabilities upon receipt of OTP active commands from the trainer system.

The CTIU 20 allows the CDNU/OFP 10 to interface with the flight training simulator via the CTIU, without changing the CDNU hardware/software configuration. The CTIU hardware/software configuration is flexible to realize multi-platform capability. Many training simulators system have similar problems. A significant cost reduction will be realized by the application of the CTIU 20 to various platforms.

A computer-based CTIU was defined to realize the external method. The communication between the CDNU with OFP 10 and the trainer system 30 is controlled by the computer-based CTIU.

Figure 7:
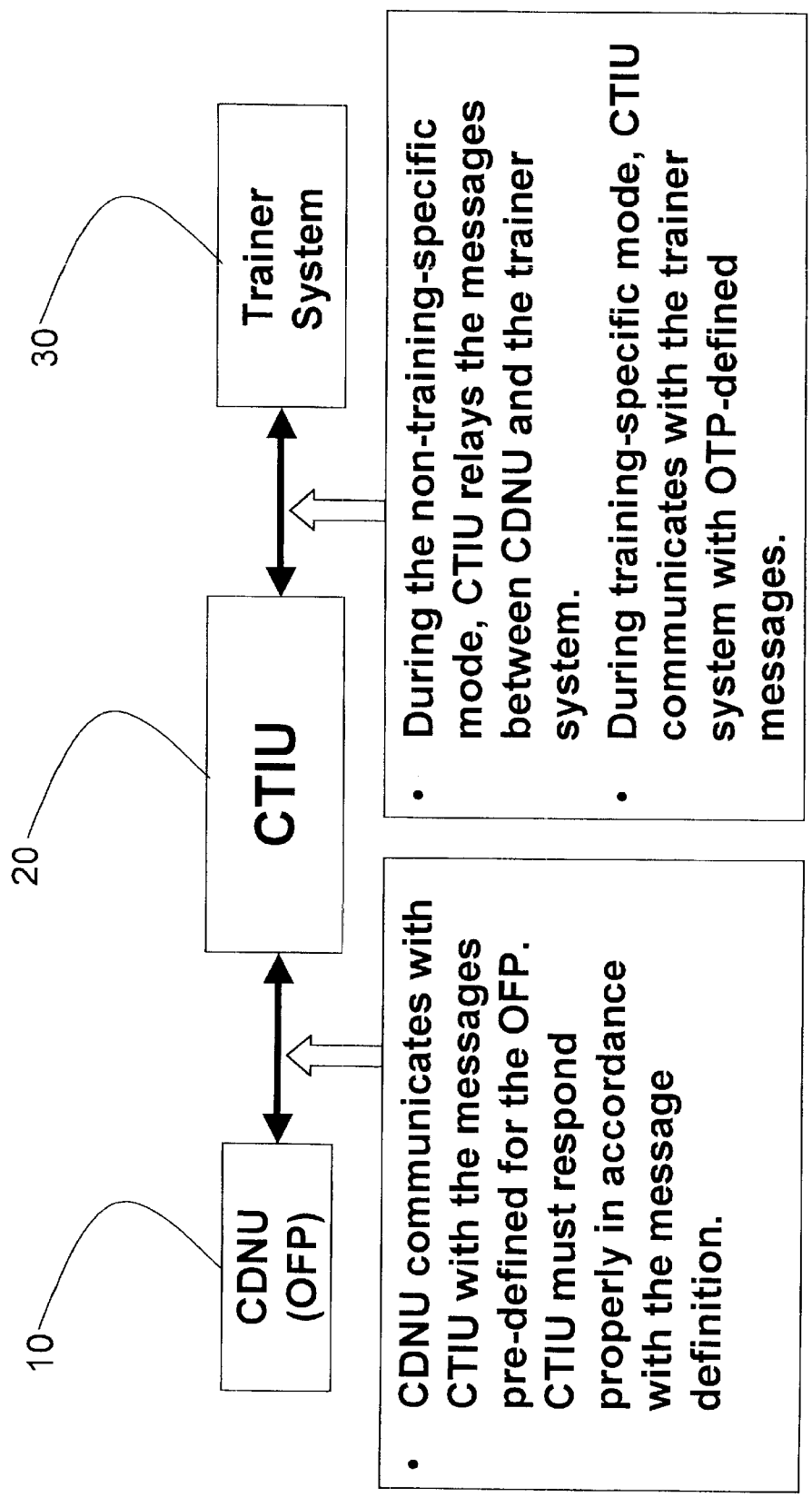
FIG. 7 is a block diagram illustrating the message definitions of the CTIU data transmissions.

An important aspect of the CTIU 20 is that the data transmission on both of the first and second CTIU multiplex data buses 211, 221 is not defined by the CTIU design itself, but by the OFP and OTP design. The data transmission on the first multiplex data bus 211 to the CDNU 10 is defined by the OFP design. The data transmission on the second multiplex data bus 221 to the trainer system 30 is defined by OTP design. In order to communicate with the CDNU/OFP 10 and the trainer system, the data transmission of the CTIU 20 must be compatible with both the OFP and OTP design. The data transmission on the first and second multiplex data buses 211, 221 is defined by the OFP and OTP messages flow on the respective bus. Therefore, the data transmissions between CTIU, CDNU, and the trainer system 30 are separately established by the OFP and OTP. This is as summarized by FIG. 7.

Multiplex data bus interface board is the key part of the CTIU. The CTIU 20 is connected to the CDNU/OFP 10 and the trainer system 30 by two sets of multiplex data bus interfaces. Two multiplex data bus interface board implementation approaches can be used, the protocol chip-based approach and the microcode-based approach. The protocol chip-based multiplex data bus boards use one or a set of specialized chips to realize multiplex data bus protocol. The multiplex data bus microcode-based board uses an on-board microprocessor for the multiplex data bus protocol realization.

The messages for the CTIU 20 are defined in this invention. The CTIU 20 must use the messages designed by the CDNU/OFP 10 and trainer OTP to communicate with the CDNU 10 and the trainer system. The CTIU operation obtains the CDNU/OFP 10 status and data for the trainer system 30 during the trainer-unique functions, and at the same time obtain proper avionics data for CDNU/OFP 10 operation.

The OTP messages are analyzed to define the proper operation for the CTIU 20 during the trainer-unique functions. The OFP messages used for CDNU BC and CDNU RT data transmission to collect CDNU status and data in real-time.

The critical issue in the CTIU operation design is that during the trainer-unique functions, all the required data from the CDNU/OFP 10 for the trainer system, and all the required avionics equipment data for the CDNU/OFP 10 from the trainer system 30 or other sources must be gathered and processed at the same time. An ARINC-429 bus interface is added to the CTIU 20 for collecting data from CDNU. The CDNU 10 outputs from the ARINC-429 bus can also be used during the trainer-unique functions. The ARINC-429 bus is a standard bus widely used in avionics systems. In the CDNU, it transmits the flight data to the signal data convert.

The CTIU 20 is installed between the CDNU 10 and the trainer system 30 to execute the external method for employing the CTIU 20 in the trainer system 30 for addressing the trainer-unique functions, including initialization/reset, freeze, run, slew, snapshot and present position calculation. In other words, the trainer-unique functions are controlled externally by the CTIU. The functions of the Operational Training Program (OTP) will be realized by the CTIU external to the CDNU/OFP 10, thus eliminating the need of employing the OTP in the CDNU. The CTIU 20 allows the CDNUI/OFP 10 to interface with the flight training simulator of the trainer system 30 via the CTIU, without changing the CDNU hardware/software configuration, so that a significant cost reduction will be realized by the application of the CTIU 20 to various platforms.

According to the present invention, the CTIU 20 comprises a computer and two pairs of multiplex data bus interfaces with proper data processing capability. Thus, the hardware configuration of the CTIU 20 can be implemented through various approaches.

The preferred architecture is one that would optimize the application software development process, thereby resulting in a faster development cycle, reduce technical risks and improve system functionality. A typical hardware configuration using the selected industrial-grade rack-mount PC hardware and the open standard PC architecture, as shown in FIG. 8.

The computer can be a typical PC desktop or laptop computers. The present invention utilizes an industrial-grade desktop and rack mountable chassis that represent a significant improvement in quality with a moderate increase in price, resulting in a system that is acceptable for the simulator application. This is a preferred embodiment for the CTIU. The CTIU 20 hardware consists of two major parts:

1. An open standard architecture based computer 200 as a computation platform for the CTIU 20.
2. Two dual channel multiplex data bus interface boards 21 and 22 are connected to the computer 200 for connecting with the CDNU 10 and the train system 30 with the first and second multiplex data buses 211, 221. Two multiplex data bus interface modules are accommodated in the computer chassis depending on the design requirements. Each of the multiplex data bus modules includes a dual redundant multiplex data bus channel. The multiplex data bus channels are programmable and can be set as Bus Controller, Remote Terminal or Bus monitor. Two pairs of multiplex data bus cables and bus couplers are used to connect the CTIU 20 to the CDNU 10 and the trainer system.

Figure 8:
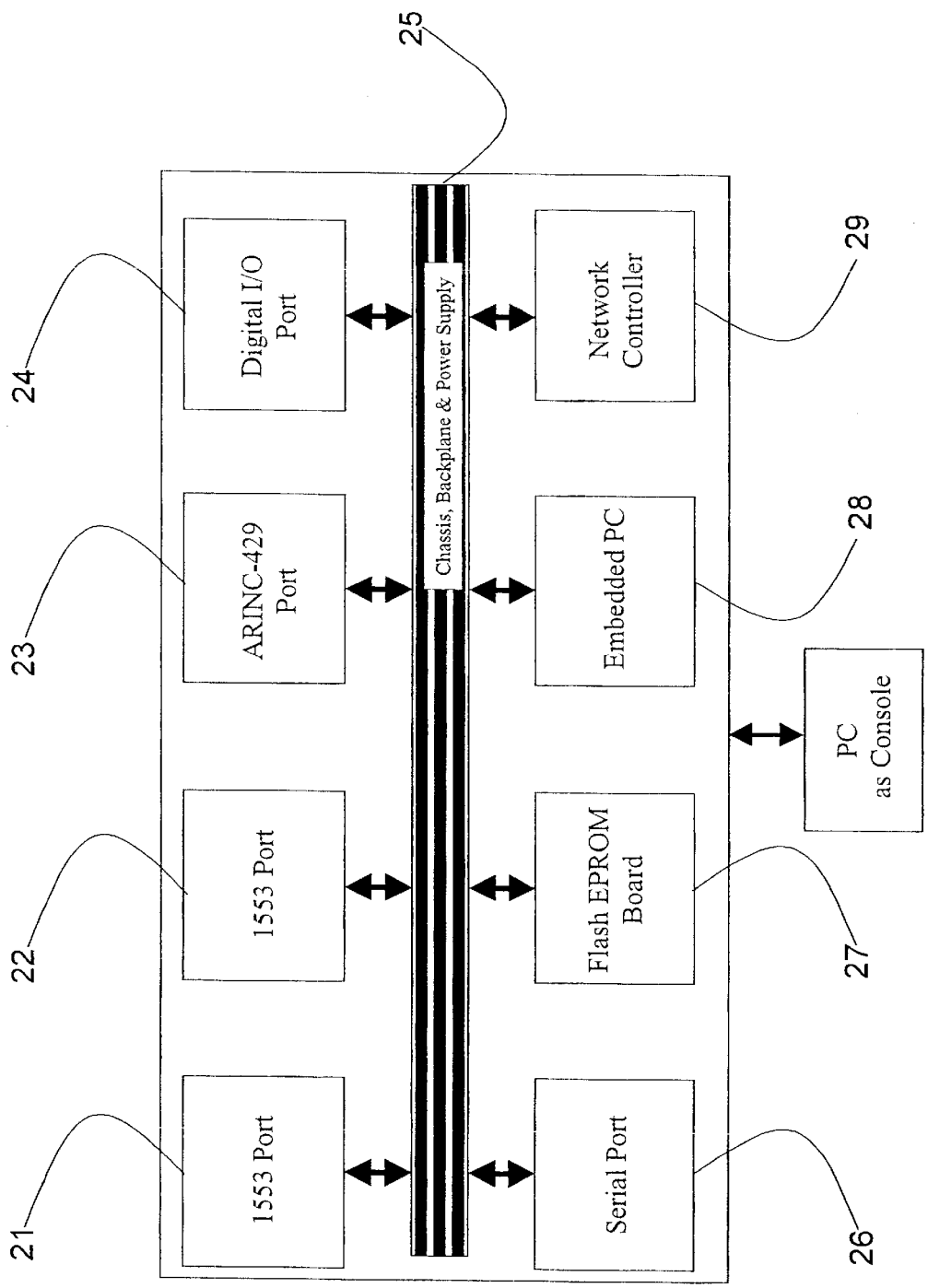
FIG. 8 is a block diagram illustrating a typical computer based CTIU hardware configuration.

Referring to FIG. 8, the open standard bus computer 200 of the present invention comprises the following components:

1. An open standard bus chassis 25 is adapted to accommodate open standard bus modules. The open standard bus chassis 25 comprises an open standard bus backplane to connect an open standard bus modules together, an enclosure to provide a mechanical frame, and a power supply.
2. A microprocessor module 28 is the core of the open standard bus computer. The CTIU data transmission and processing are carried out by the microprocessor module. In order to make the optimum use of a PC operating system and software, a PC/AT compatible open standard bus single board computer with a Pentium processor was chosen.
3. A EPROM memory module 27 which is an open standard bus Flash EEPROM memory board provides non-volatile storage for the open standard bus computer. The operating program code can be stored in this module and it can act like a disk drive. The data collected by the Bus Monitor of the CTIU 20 can also be stored in the module.
4. A ARINC-429 interface module 23 is used to collect require data from the CDNU ARINC-429 interface for the CTIU 20 for use during the trainer-unique functions.
5. A digital I/O port module 24 is used to receive discrete signals from the CDNU 10 and trainer system 30 for determining whether the trainer system 30 request the trainer unique functions.

6. A serial port 26 is used to communicate with a PC console which provide a monitor and a keyboard for user interface.

7. A network controller 29 is used to connect the CTIU 20 to other devices during the system development and test phase or connect the CTIU 20 to the simulation host computer during the training operation.

The major part of the CTIU task is the multiplex data bus communication control, data collection, data storage, and data retrieve. Most of the tasks are real-time operation. This impose some strict requirement on the CTIU real-time design, such as:

(a) During the non-trainer-specific mode, the CTIU 20 relays the data transmission between the CDNU/OFP 10 and trainer system 30 using the two multiplex data bus interfaces. The delay caused by the relaying must satisfy the multiplex data bus response time requirement.

(b) During the trainer-specific mode, the CTIU 20 communicates with both the CDNU/OFP 10 and trainer system 30 simultaneously. The computer must operate fast enough to internally perform data processing and two multiplex data buses message control.

(c) The CTIU 20 also needs to communicate with the CDNU ARINC-429 interface to collect data for trainer-specific function processing.

Figure 9:
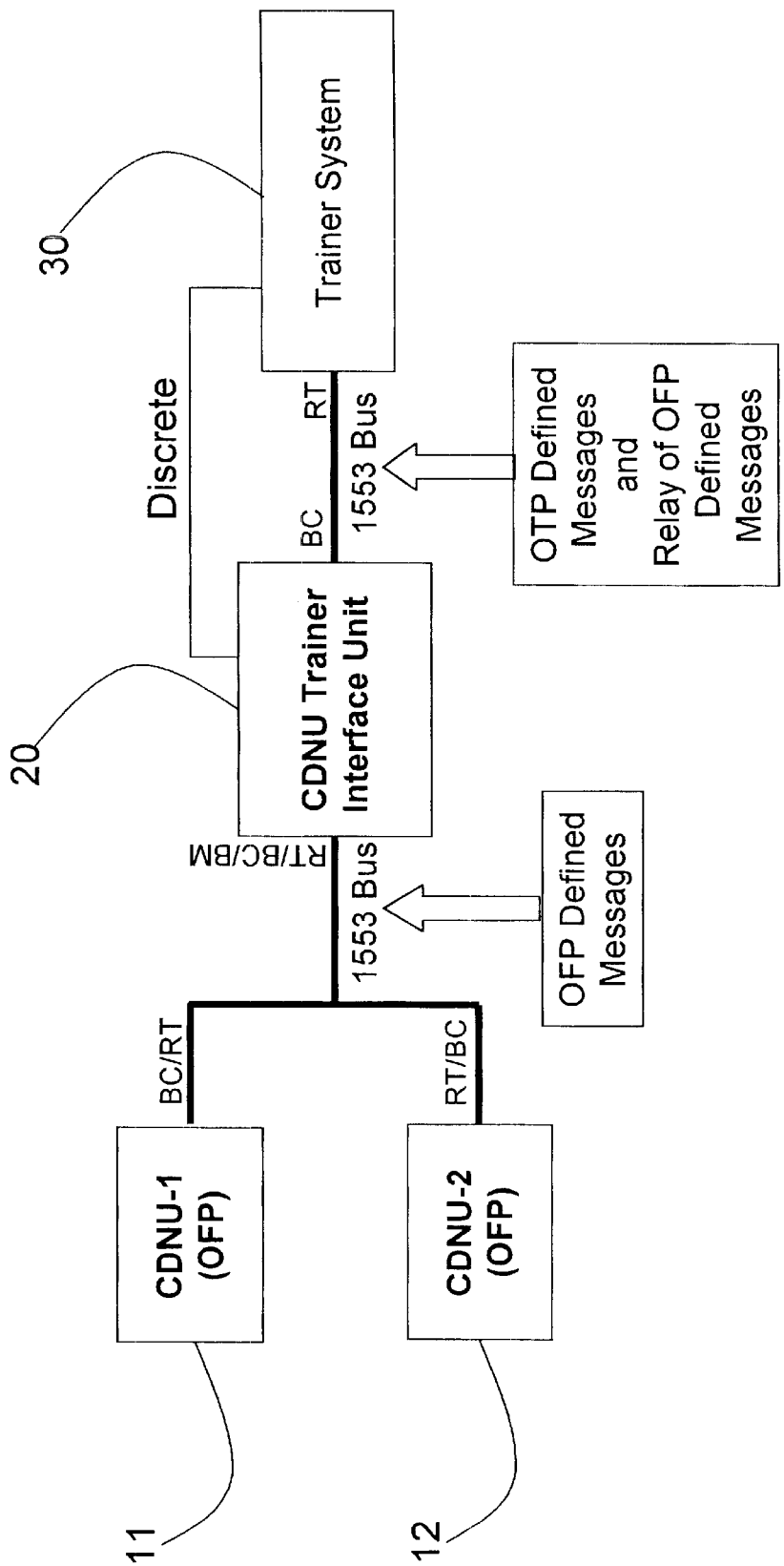
FIG. 9 is a block diagram illustrating a CTIU controlled data transmission.

A critical characteristic of the CTIU design is that the data transmission on both CTIU multiplex data bus interfaces is not defined by the CTIU design itself, but by the OFP and OTP design respectively. The data transmission messages of the OFP and OTP have been pre-defined by the OFP and OTP design. The data transmission on the first multiplex data bus to the CDNU 10 is defined by the OFP design. The data transmission on the second multiplex data bus to the trainer system 30 is defined by OTP design. In order to communicate with the CDNU/OFP 10 and the trainer system, the data transmission of the CTIU 20 must be compatible with both the OFP and OTP message design. The CTIU 20 separates the CDNU/OFP 10 and the trainer system, which is not compatible to each other. It is the CTIU's responsibility to establish the compatible communications between CDNU/OFP 10, CTIU 20 and trainer system, as shown in FIG. 9.

The CTIU operational design provides that, with respect to the trainer system, the CTIU 20 acts like a CDNU with OTP. During the non-training-specific mode, the CTIU 20 relays the messages between the CDNU 10 and the trainer system. During the training-specific mode, the CTIU 20 intercepts the messages from the trainer system 30 and communicates as a CDNU with OTP 10.

The hardware and software of the CTIU 20 is arranged to provide the functionality to recognize an external computer, a remote terminal (RT) on the CTIU controlled multiplex data bus, that is used for aircrew training. The CTIU software will be able to address the following trainer-unique functions:

a) External OTP Discrete.

b) System Initialization/Reset.

c) System Freeze.

d) Slewing.

e) Snapshot Recall.

f) Present Position Reporting.

The trainer system 30 provides an external interface to the CTIU 20 as required to stimulate the CDNU with OTP in accordance with the training mission requirements. Through the CTIU 20, the trainer system 30 have the capability to individually responses to four CDNU with OFP avionics functions:

a) Flight Management System (FMS).

b) Area Navigation (RNAV).

c) Display System.

d) Communications System.

The multiplex data bus 221 transmit messages from the Trainer Systems OTP to the CDNU Trainer Interface Unit (CTIU) are listed in Table 1. It is noted that the CTIU 20 use the same multiplex data bus messages as OTP in order to communicate with the trainer system 30 during the trainer-unique functions. Each transmit includes a Checksum Data Word. The checksum shall occupy the last word position of the multiplex data bus transmit message.

TABLE 1

Message Flow between Interface Unit BC and Trainer OTP RT functions

| Message ID | Message Name | From | To |
| --- | --- | --- | --- |
| CDNUBC-SIM 02 | CDNU acknowledge | Interface Unit BC | Trainer SIM |
| CDNUBC-SIM 03 | CDNU snapshot recall | Interface Unit BC | Trainer SIM |
| CDNUBC-SIM 07 | Communication status | Interface Unit BC | Trainer SIM |
| CDNUBC-SIM 08 | RNAV status | Interface Unit BC | Trainer SIM |
| CDNUBC-SIM 11 | Display system status | Interface Unit BC | Trainer SIM |
| CDNUBC-SIM 13 | CDNU snapshot download | Interface Unit BC | Trainer SIM |
| CDNUBC-SIM 15 | FMS status | Interface Unit BC | Trainer SIM |
| SIM 02-CDNUBC | SIM acknowledge | Trainer SIM | Interface Unit BC |
| SIM 02-CDNUM* | SIM Xmit status word MC | Trainer SIM | Interface Unit BC |
| SIM 03-CDNUBC | SIM snapshot recall | Trainer SIM | Interface Unit BC |
| SIM 04-CDNUM* | SIM Xmtr shutdown MC | Trainer SIM | Interface Unit BC |
| SIM 05-CDNUM* | SIM Override Xmtr Shut. MC | Trainer SIM | Interface Unit BC |
| SIM 06-CDNUBC | Simulator functions | Trainer SIM | Interface Unit BC |
| SIM 08-CDNUM* | SIM Reset RT MC | Trainer SIM | Interface Unit BC |
| SIM 13-CDNUBC | SIM snapshot download | Trainer SIM | Interface Unit BC |
| SIM 16-CDNUBC | SIM Reposition, backdrive | Trainer SIM | Interface Unit BC |
| SIM 16-CDNUBC | SIM Reposition, standby | Trainer SIM | Interface Unit BC |

TABLE 1-continued

Message Flow between Interface Unit BC and Trainer OTP RT functions

| Message ID | Message Name | From | To |
| --- | --- | --- | --- |
| SIM 18-CDNUM* | SIM Xmit last CW MC | Trainer SIM | Interface Unit BC |
| SIM 19-CDNUM* | SIM Xmit BIT word MC | Trainer SIM | Interface Unit BC |
| SIM 23-CDNUBC | SIM snapshot upload | Trainer SIM | Interface Unit BC |
| CDNUBC-Test01 | CDNU Integrated NAV Solution | Interface Unit BC | Test01 |

The CTIU 20 activates the OTP capabilities thereof upon receipt of the external OTP Active discrete. When this discrete is inactive, all multiplex data bus messages associated with the OTP function, as well as all capabilities associated with this function will be disabled and the CDNU 10 will execute its OFP. When this discrete is active, all capabilities and all multiplex data bus messages associated with the OTP will be enabled. During the execution of the Trainer-unique functions, the Interface Unit must also communicate with the CDNU/OFP 10.

According to the preferred embodiment of the present invention, the external method for employing the CDNU 10 in the trainer system 30 to address a plurality trainer-unique functions, wherein the CTIU 20 connected between the CDNU with OFP 10 and the trainer system 30 via a first and a second multiplex data bus 211, 221 respectively. The external method comprises the steps of (a) reading an external OTP discrete periodically in an execute cycle via the digital I/O port 24;

(b) verifying whether the external OTP discrete is active or inactive;

(c) disabling all OTP functions when the external OTP discrete is inactive by the CTIU 20 and relaying messages between the trainer system 30 and the CDNU with OFP 10 by the CTIU 20; and (d) enabling each of the OTP functions by communicating with the trainer system 30 via OTP defined multiplex data bus messages when the external OTP discrete is active, and enabling at least a trainer-unique function depending on commands from the trainer system.

In the above step (d), when the trainer-unique function is addressed to system initialization/reset, the CTIU 20 shall initialize or reset, as commanded by the trainer system 30. The step (d) further comprises the following steps:

(d1-1) Receive a command message to reposition or reset by the CTIU 20.

(d1-2) Verify a Checksum and external OTP Active Input Discrete from the trainer system 20.

(d1-3) Respond to the command message by transmitting a first OTP Message CDNUBC-SIM 02, CDNU Acknowledge Wordstring with the Message Code Word (CDNUBC-SIM 02-05) set to NAK and ignore the command message, when the Checksum is not valid.

(d1-4) Acknowledge the command message by transmitting a second OTP Message CDNUBC-SIM 02, CDNU Acknowledge Wordstring with the Message Code Word (CDNUBC-SIM 02-05) set to ACK to the trainer system 30, when the Checksum is valid.

(d1-5) Receive initial or reset states from the trainer system 30.

(d1-6) Send the initial or reset states to the CDNU 20 via the second multiplex data bus 211 by using CDNU defined messages.

When the trainer-unique function is addressed to freeze, Message SIM 06-CDNUBC, Simulator Functions Wordstring initiates or terminates a CDNU avionics function(s) freeze condition, based on avionics function and the step (d) comprises the following steps:

(d2-1) Ignore the command when a Checksum is verified not valid.

(d2-2) Confirm a freeze condition through Message CDNUBC-SIM 07, Communications, Message CDNUBC-SIM 08 when the Checksum is verified valid and the CDNU 10 is in a RNAV mode.

(d2-3) Confirm the freeze condition through Message CDNUBC-SIM 11, Display Systems, and/or Message CDNUBC-SIM 15 when the CDNU 10 is in a FMS mode.

(d2-4) Send corresponding data saved in the CTIU 20 or from the trainer system 30 when the CDNU 10 requests flight states.

(d2-5) Receive flight state data from the trainer system 30 and transfer the flight state data to the CDNU 10 when the flight state data are slewed or changed by the trainer system 30.

During a freeze, the trainer system 30 will discontinue all processing or operations (suspends numeric and logical calculations with no degradation to training for an indefinite period of time). It shall also mean that visual or graphical effects are frozen in time until the freeze is removed. The CTIU 20, while commanded to freeze, will provide the aircrew the capability to access the displays and obtain information.

When the trainer-unique function is addressed to slewing, the trainer system 30 will use the slewing function to introduce slow or rapid changes into the simulation environment. The step (d) comprises the following steps:

(d3-1) Start slew condition when a slewing command message is received via Message SIM 06-CDNUBC, Simulator Functions Wordstring from the trainer system 30.

(d3-2) Determine whether a Checksum is valid after receives the slewing command message.

(d3-3) Ignore the slewing command message when the Checksum is not valid;

(d3-4) Confirm the slew condition through Message CDNUBC-SIM 07, Communications, Message CDNUBC-SIM 08, when the Checksum is valid and the OTP Active Input Discrete is active, and that the CDNU 10 is in a RNAV mode.

(d3-5) Confirm the slew condition through Message CDNUBC-SIM 11, Display Systems, and/or Message CDNUBC-SIM 15, when the CDNU 10 is in a FMS mode.

(d3-6) Receive slewed or changed state data from the trainer system 30.

(d3-7) Change a clock rate of the processing and sends a state data to the CDNU 10 when requested.

When the trainer-unique function is addressed to snapshot, the CTIU will provide the capability for the trainer system to command a snapshot to store specific conditions for later use. The function shall consist of a Snapshot Take function, Snapshot Upload function, Snapshot Download function, and a Snapshot Recall function.

When the trainer system 30 requests repeat function, the CTIU 20 catches and saves all the state data in the computer mass memory. And later re-send these data to the trainer system 30 or the CDNU 10 according to the system request. This function is described in the trainer system 30 as snapshot take, snapshot upload, snapshot download, and snapshot recall.

The step (d) further comprises the following steps:

(d4-1) Start a snapshot function when the CTIU 20 receives Message SIM 06-CDNUBC, Simulator Functions Wordstring, from the trainer system 30.

(d4-2) Determine whether a Checksum of a snapshot command message is valid.

(d4-3) Ignore the snapshot command message when the Checksum is not valid.

(d4-4) Confirm a Snapshot function through Message CDNUBC-SIM 07, when the Checksum is valid, and the CDNU 10 is in a Communications mode.

(d4-5) Confirm the Snapshot function through Message CDNUBC-SIM 08, when the CDNU 10 is in a RNAV mode.

(d4-6) Confirm the Snapshot function through Message CDNUBC-SIM 11, Display Systems, and/or Message CDNUBC-SIM 15, when the CDNU 10 is in a FMS mode.

(d4-7) Take and save all the state data to the CTIU computer when a snapshot take function is requested.

(d4-8) Send the saved state data to the trainer system 30 when a snapshot upload function is requested.

(d4-9) Receive the state data from the trainer system 30 and updates the saved state data when a snapshot download function is requested.

(d4-10) Repeat the saved state data and send the saved state data to the CDNU 10 and the trainer system 30 when a snapshot recall function is requested.

When the trainer-unique function is addressed to present position reporting, the CTIU will provide the trainer system 30 its own internally updated aircraft position in order to allow the Trainer OTP to synchronize the CDNU calculated position with the trainer system calculated position. The data will be provided via the multiplex data buses 211, 221. The CTIU 20 will output present position latitude and longitude, based on the CDNU's integrated navigation solution, in Message CDNUBC-TEST01 at a 1 Hz rate. The step (d) further comprises the following steps:

(d5-1) Take position data from the CDNU 10 when a Present Position Reporting is requested by the trainer system 30.

(d5-2) Send the position data to the trainer system 30 by Message CDNUBC-TEST01 at a 1 Hz rate.

(d5-3) Command the trainer system 30 to update a calculated position to the received position data.

The CTIU operation provides that, with respect to CDNU/OFP 10, the CTIU 20 acts like a part of real navigation and communication equipment. During the non-training-specific mode, the CTIU 20 relays the messages between the CDNU 10 and the trainer system 30. During the training-specific mode, the CTIU 20 implements the training-specific operation and communicates with the OFP as the real avionics equipment. With respect to the pilots, CDNU/OFP 10 allows them to deal with the trainer-specific operations. The CTIU 20 must respond to the OFP massages properly and communicate the required data to the CDNU 10, as illustrated in FIG. 10.

One of the critical issues in the CTIU software operation design is to gather the required data from the CDNU/OFP 10 for the trainer system 30 during the trainer-unique functions and at the same time gather all the required avionics equipment data for the CDNU/OFP 10 from the trainer system 30 or other sources.

There are several ways to obtain the required data, such as using multiplex data bus Monitor mode to intercept the nonvolatile memory (NVM) and scratchpad data exchange between the CDNU bus controller (BC) and CDNU remote terminal (RT). Exchanged data between the CDNU BC and CDNU RT represent state data for the slave CDNU to assume control. This exchanged data contain a part of the required data during the trainer-unique functions. For the CDNU required data during the trainer-unique functions, some data can be collected from the trainer system 30, and some data fed by sending constant or special modified data, depending on the function to be emulated.

In the real avionics system, the messages defined by the OFP are used to exchange data between CDNU BC, CDNU RT and other avionics equipment. In the trainer system 30, these OFP-defined messages are used by the CTIU 20 to communicate with the CDNU 10 and collect data for the trainer system 30.

During the normal simulation mode, the trainer system 30 acts just like the real avionics equipment, and is compatible with the CDNU with OFP 10. The CTIU 20 just relays the data transmission between the CDNU/OFP 10 and the trainer system 30.

During the trainer-unique functions, the trainer system 30 stops specific emulation of the avionics equipment and requires extra data from the CDNU 10. The CTIU 20 must still feed both the CDNU with OFP 10 and trainer system 30 with proper data. Data collection is then an important task of the CTIU 20. Most data are collected by making use of the messages defined by OFP and OTP.

The CDNU with OFP 10 provides the pilot integrated control and display management of common global positioning system (GPS), communication and navigation equipment. In addition, avionics power control and system status can be displayed. Two CDNUs 11, 12 are installed on the pilot and copilot consoles and are used to initiate or change user system modes and operating parameters, and to input data to the Avionics Control System (ACS). The CDNU 10 is equipped with a continuously running built-in-test (BIT) to advise the operator of the system status and also allow the operator to manually initiate BIT of selected communication and navigation equipment. All information and functions provided by the ACS are available to the pilot and copilot.

The CDNU BC initiates all transmissions on the data bus. In order to communicate with the CDNU with OFP 10, The CTIU 20 must uses the multiplex data bus messages defined by the OFP. The message flows also define the transmission between the CDNU with OFP 10 and the CTIU 20.

The functions of the CTIU 20 are realized by message transmission on the multiplex data buses 211, 221. The design and implementation of the multiplex data bus interfaces 21, 22 have been investigated. Multiplex data bus interface board 21, 22 is the key part of the CTIU 20. The CTTU 20 is connected to the CDNU with OFP 10 and the trainer system 30 by two sets of multiplex data bus interfaces 21, 22.

The preferred multiplex data bus implementation is the MIL-STD-1553B data bus which are widely used in avionics systems.

The commercial-off-the-shelf (COTS) MIL-STD-1553B boards meet the needs of many applications and mixed-device bus simulations. Single and multi-function COTS boards are available, making it easy to configure the ideal MJL-STD-1553B system for hardware development, software development, and production test applications. With software compatibility across different backplanes, the COTS boards meet MIL-STD-1553B communication and simulation needs accurately, efficiently, and economically.

The COTS MIL-STD-1553B board manufacturers also provide supporting software for the testing and application. The typical features of a COTS software are as follows:

Real-time display and disk capture of bus activity (BC, RT, BM).

Real-time data modification (BC, RT).

Full Error injection and detection.

Simulation of 32 RTs with programmable buffers.

Supports multiple MIL-STD-1553B channels & single and multifunction hardware.

The graphical interface is usually provided for MIL-STD-1553B bus analysis. It is easy to use for general purpose data acquisition, mission loading, testing and data bus debugging. The software for the system uses a common top level menu that accesses overlay modules, which are board/interface specific. It is self configuring, depending upon the hardware interfaces that are installed.

The menu structure allows the user to independently define data to be captured, or displayed, as well as the option to display the data in easy to under-stand engineering units. The software can work with two dual channel cards, one dual channel and two single channel cards, or four single channel cards. It automatically recognizes the hardware that is present in the system and once configured, the setup information can be stored to disk. Different setups can be stored for each application.

The user has full control over the manner in which events are displayed and the data to be captured to disk in real time. Once captured, the data can be easily exported to an ASCII file using an icon on the toolbar. It can also be translated to other database formats.

Using COTS software in any of the three modes is easy. Previously stored setups can be loaded for quick operation. An Activity screen allows the user to quickly see which RTs and sub-addresses are active.

The menu structure allows the user to access all three modes of the MIL-STD-1553B card: Bus Controller, multiple Remote Terminal emulation and Bus Monitor:

1. Bus Controller: This mode supports all of the bus instructions, including several conditional branch instructions.
2. Remote Terminal: This mode supports emulation of up to an entire suite of RTs with all sub-addresses. Each RT has a Power button, enabling the user to easily disable any configured RT without deleting the configuration information.
3. Bus Monitor: This mode allows the user to view specific messages in real time on a configurable screen display. Using MIL-STD-1553B Word definitions, the bus monitor mode can show data in engineering units. The software can also acquire all data to a disk file in real time, Filter and Find options are available for post processing data. The user can also insert Event Markers into the data stream.

The messages definition and analysis for the CTIU 20 are the key design for the invention. The CTIU 20 must use the messages designed by the CDNU with OFP 10 and trainer OTP to communicate with the CDNU 10 and the trainer system 30. The problem for the CTIU operation is how to obtain the CDNU with OFP 10 status and data for the trainer system 30 during the trainer-unique functions, and at the same time obtain proper avionics data for CDNU with OFP 10 operation. The OTP messages are analyzed one by one to define the proper operation for the CTIU 20 during the trainer-unique functions. The OFP messages used for CDNU BC and CDNU RT data transmission are analyzed to collect CDNU status and data in real-time.

According to the present invention, the CTIU 20 is connected between the CDNU with OFP 10 and the trainer system 30 to control the message transmission between the CDNU with OFP 10 and the trainer system 30. It communicates with both the trainer system 30 and the CDNU with OFP 10, using two sets of MW-STD-1553B buses 211, 221 as shown in FIG. 9. The functions of the Operational Training Program (OTP) are realized by the CTIU 20 external to the CDNU with OFP 10. The CTIU 20 activates OTP-equivalent capabilities upon receipt of OTP active commands from the trainer system 30.

It is noted that the formats of OTP defined messages are used. Thus, the contents of the CTIU messages are the same as those of OTP messages, but the operations related to the messages are different.

As mentioned above, the CTIU 20 is so designed that, during the non-training-specific mode, the CTIU 20 relays the messages between CDNU 10 and the trainer system 30, and during the trainer-unique functions, the CTIU 20 communicates with the trainer system 30 by OTP messages and with the CDNU 10 by OFP messages. One of the most critical issues in the CTIU software operation design is how to collect all the required data from the CDNU with OFP 10 for the trainer system 30 during the trainer-unique functions.

Using multiplex data bus Monitor mode to intercept the Non Volatile Memory (NVM) and scratchpad data exchange between the CDNU BC and CDNU RT is a possible approach. Exchanged data between the CDNU BC and CDNU RT represent state data for the slave CDNU to assume control. This exchanged data contain a part of the required data during the trainer-unique functions. The messages defined by the OFP are used to exchange data between CDNU BC, CDNU RT and other avionics equipment. In the trainer system 30, these OFP-defined messages are used by the CTIU 20 to communicate with the CDNU 10 and collect data from the CDNU 10. Table 2 shows contents and a brief description of the messages used for the communication between the CDNU BC and CDNU RT.

TABLE 2

Message Flow between CDNU BC and CDNU RT

| Message ID | Message Name | From | To |
|---|---|---|---|
| CDNU-CDN*01 | Display Line 1 | CDNU BC | CDNU RT |
| CDNU-CDN*02 | Display Line 2 | CDNU BC | CDNU RT |
| CDNU-CDN*03 | Display Line 3 | CDNU BC | CDNU RT |
| CDNU-CDN*04 | Display Line 4 | CDNU BC | CDNU RT |
| CDNU-CDN*05 | Display Line 5 | CDNU BC | CDNU RT |
| CDNU-CDN*06 | Display Line 6 | CDNU BC | CDNU RT |
| CDNU-CDN*07 | Display Line 7 | CDNU BC | CDNU RT |
| CDNU-CDN*08 | Display Line 8 | CDNU BC | CDNU RT |
| CDNU-CDN*09 | Scratch pad control | CDNU BC | CDNU RT |
| CDNU-CDN*11 | NVM data | CDNU BC | CDNU RT |
| CDNU-CDN*12 | NVM data | CDNU BC | CDNU RT |
| CDNU-CDN*13 | Output discrete | CDNU BC | CDNU RT |
| CDNU-CDN*20 | BIT control | CDNU BC | CDNU RT |
| CDNU-CDN*30 | Data wraparound | CDNU BC | CDNU RT |
| CDN*01-CDNUBC | Key press data | CDNU RT | CDNU BC |

TABLE 2-continued

Message Flow between CDNU BC and CDNU RT

| Message ID | Message Name | From | To |
|---|---|---|---|
| CDN*01-CDNUBC | Key press data | CDNU RT | CDNU BC |
| CDN*02-CDNUBC | Input discrete | CDNU RT | CDNU BC |
| CDN*08-CDNUBC | Reset RT MC | CDNU RT | CDNU BC |
| CDN*20-CDNUBC | BIT status | CDNU RT | CDNU BC |
| CDN*30-CDNUBC | Data wraparound | CDNU RT | CDNU BC |

It is noted that the Non volatile Memory (NVM) data contains some of the CDNU status data required during the execution of trainer-unique functions. The NVM stored data consist of flight plan, routes, waypoints, targets, pattern parameters, communication frequencies, presets, call signs, NAV operating modes, TACAN parameters, and active page display parameters etc. Aircraft present position is stored and automatically stored upon discrete transition from air to ground. Avionics configuration data are stored at initial power-up and aperiodically during operation.

Each CDNU 10 has equal access to the stored data. Any addition, deletion, or other edit through the pilots CDNU is considered to have been made through the copilots CDNU. When prime power is applied, a copy of the pilots stored data is automatically transferred to the copilots CDNU. This transfer is accomplished through normal multiplex data bus messages and is not annunciated to the operator. The bus-controlling CDNU's stored data overwrites any existing data on the other CDNU. The CTIU can intercept the NVM data by using the Bus Monitor mode.

Every aircraft trainer system using a CDNU has the problems of modifying the OFP to an OTP. By means of the external method and the CTIU 20 of the present invention, the modification of the OFP and/or development of the OTP can be eliminated. The CTIU 20 can be applied in any trainer system 30 that employs the CDNU 10. The hardware and software designs of the CTIU 20 are flexible to provide multi-platform capability.

What is claimed is:

1. An external method for employing a Control Display Navigation Unit loaded with an Operational Flight Program (CDNU/OFP) in a trainer system by connecting a CDNU Trainer Interface Unit (CTIU) between the CDNU/OFP and the trainer system via a first and a second multiplex data bus respectively, wherein said external method comprises said steps of:
   (a) reading an external Operational Trainer Program (OTP) discrete periodically in an execute cycle;
   (b) verifying whether said external OTP discrete is active or inactive;
   (c) disabling all OTP functions when said external OTP discrete is inactive by said CTIU and relaying messages between said trainer system and said CDNU/OFP by said CTRU; and
   (d) enabling each of said OTP functions by communicating with said trainer system via OTP defined multiplex data bus messages when said external OTP discrete is active, and enabling at least a trainer-unique function depending on commands from said trainer system.

2. The external method as recited in claim 1 wherein when said CTIU initializes or resets as commanded by said trainer system, the step (d) further comprises the steps of:
   (d1-1) receiving a command message to reposition or reset by said CTIU;
   (d1-2) verifying a Checksum and external OTP Active Input Discrete from said trainer system;
   (d1-3) responding to said command message by transmitting a first OTP Message CDNUBC-SIN 02, CDNU Acknowledge Wordstring with said Message Code Word (CDNUBC-SIM 02-05) set to NAK and ignoring said command message when said Checksum is not valid;
   (d1-4) acknowledging said command message by transmitting a second OTP Message CDNUBC-SIM 02, CDNU Acknowledge Wordstring with said Message Code Word (CDNUBC-SIM 02-05) set to ACK to said trainer system when said Checksum is valid;
   (d1-5) receiving initial or reset states from said trainer system, and
   (d1-6) sending said initial or reset states to said CDNU/OFP via said second multiplex data bus by using CDNU defined messages.

3. The external method as recited in claim 1 wherein when Message SIM 06-CDNUBC, Simulator Functions Wordstring initiates and terminates a CDNU avionics function freeze condition based on an avionics function, the step (d) comprises the steps of:
   (d2-1) ignoring a command when a Checksum is verified not valid;
   (d2-2) confirming a freeze condition through Message CDNUBC-SIM 07, Communications, Message CDNUBC-SIM 08 when said Checksum is verified valid and said CDNU/OFP is in a RNAV mode;
   (d2-3) confirming said freeze condition through Message CDNUBC-SIM 11, Display Systems, and/or Message CDNUBC-SIM 15 when said CDNU/OFP is in a FMS mode;
   (d2-4) sending corresponding data saved in said CTTU and from said trainer system when said CDNU/OFP requests flight states; and
   (d2-5) receiving flight state data from said trainer system and transferring said flight state data to said CDNU/OFP when said flight state data are slewed and changed by said trainer system.

4. The external method as recited in claim 2 wherein when Message SIM 06-CDNUBC, Simulator Functions Wordstring initiates and terminates a CDNU avionics function freeze condition based on an avionics function, the step (d) comprises the steps of:
   (d2-1) ignoring a command when a Checksum is verified not valid;
   (d2-2) confirming a freeze condition through Message CDNUBC-SIM 07, Communications, Message CDNUBC-SIM 08 when said Checksum is verified valid and said CDNUI/OFP is in a RNAV mode;
   (d2-3) confirming said freeze condition through Message CDNUBC-SIM 11, Display Systems, and/or Message CDNUBC-SIM 15 when said CDNU/OFP is in a FMS mode;
   (d2-4) sending corresponding data saved in said CTIU and from said trainer system when said CDNU/OFP requests flight states; and
   (d2-5) receiving flight state data from said trainer system and transferring said flight state data to said CDNU/OFP when said flight state data are slewed and changed by said trainer system.

5. The external method as recited in claim 1 wherein when said trainer system uses a slewing function to introduce slow and rapid changes into a simulation environment, the step (d) comprises the steps of:
   (d3-1) starting a slew condition when a slewing command message is received via Message SIM 06-CDNUBC, Simulator Functions Wordstring from said trainer system;

(d3-2) determining whether a Checksum is valid after receiving said slewing command message;

(d3-3) ignoring said slewing command message when said Checksum is not valid;

(d3-4) confirming said slew condition through Message CDNUBC-SIM 07, Communications, Message CDNUBC-SIM 08, when said Checksum is valid and said OTP Active Input Discrete is active, and that said CDNU/OFP is in a RNAV mode;

(d3-5) confirming said slew condition through Message CDNUBC-SIM 11, Display Systems, and/or Message CDNUBC-SIM 15, when said CDNU/OFP is in a FMS mode;

(d3-6) receiving stewed and changed state data from said trainer system; and (d3-7) changing a clock rate of said processing and sending a state data to said CDNU/OFP when requested.

6. The external method as recited in claim 2 wherein when said trainer system uses a stewing function to introduce slow and rapid changes into a simulation environment, the step (d) comprises the steps of:

(d3-1) starting a slew condition when a slewing command message is received via Message SIM 06-CDNUBC, Simulator Functions Wordstring from said trainer system;

(d3-2) determining whether a Checksum is valid after receiving said stewing command message;

(d3-3) ignoring said slewing command message when said Checksum is not valid;

(d3-4) confirming said slew condition through Message CDNUBC-SIM 07, Communications, Message CDNUBC-SIM 08, when said Checksum is valid and said OTP Active Input Discrete is active, and that said CDNU/OFP is in a RNAV mode;

(d3-5) confirming said slew condition through Message CDNUBC-SIM 11, Display Systems, and/or Message CDNUBC-SIM 15, when said CDNU/OFP is in a FMS mode;

(d3-6) receiving slewed and changed state data from said trainer system; and (d3-7) changing a clock rate of said processing and sending a state data to said CDNU/OFP when requested.

7. The external method as recited in claim 3 wherein when said trainer system uses a slewing function to introduce slow and rapid changes into a simulation environment, the step (d) comprises the steps of:

(d3-1) starting a slew condition when a stewing command message is received via Message SIM 06-CDNUBC, Simulator Functions Wordstring from said trainer system;

(d3-2) determining whether a Checksum is valid after receiving said stewing command message;

(d3-3) ignoring said slewing command message when said Checksum is not valid;

(d3-4) confirming said slew condition through Message CDNUBC-SIM 07, Communications, Message CDNUBC-SIM 08, when said Checksum is valid and said OTP Active Input Discrete is active, and that said CDNU/OFP is in a RNAV mode, (d3-5) confirming said slew condition through Message CDNUBC-SIM 11, Display Systems, and/or Message CDNUBC-SIM 15, when said CDNU/OFP is in a FMS mode;

(d3-6) receiving stewed and changed state data from said trainer system; and (d3-7) changing a clock rate of said processing and sending a state data to said CDNU/OFP when requested.

8. The external method as recited in claim 4 wherein when said trainer system uses a slewing function to introduce slow and rapid changes into a simulation environment, the step (d) comprises the steps of:

(d3-1) starting a slew condition when a stewing command message is received via Message SIM 06-CDNUBC, Simulator Functions Wordstring from said trainer system;

(d3-2) determining whether a Checksum is valid after receiving said slewing command message;

(d3-3) ignoring said stewing command message when said Checksum is not valid;

(d3-4) confirming said slew condition through Message CDNUBC-SIM 07, Communications, Message CDNUBC-SIM 08, when said Checksum is valid and said OTP Active Input Discrete is active, and that said CDNU/OFP is in a RNAV mode;

(d3-5) confirming said slew condition through Message CDNUBC-SIM 11, Display Systems, and/or Message CDNUBC-SIM 15, when said CDNU/OFP is in a FMS mode;

(d3-6) receiving slewed and changed state data from said trainer system; and (d3-7) changing a clock rate of said processing and sending a state data to said CDNU/OFP when requested.

9. The external method as recited in claim 1 wherein when said CTIU provides a capability for said trainer system to command a snapshot to store specific conditions for later use, the step (d) further comprises the steps of:

(d4-1) starting a snapshot function when said CTIU receives Message SIM 06-CDNUBC, Simulator Functions Wordstring, from said trainer system;

(d4-2) determining whether a Checksum of a snapshot command message is valid;

(d4-3) ignoring said snapshot command message when said Checksum is not valid;

(d4-4) confirming a Snapshot function through Message CDNUBC-SIM 07, when said Checksum is valid, and said CDNU/OFP is in a Communications mode;

(d4-5) confirming said Snapshot function through Message CDNUBC-SIM 08, when said CDNU/OFP is in a RNAV mode;

(d4-6) confirming said Snapshot function through Message CDNUBC-SIM 11, Display Systems, and/or Message CDNUBC-SIM 15, when said CDNU/OFP is in a FMS mode;

(d4-7) taking and saving all state data to a CTIU computer of said CTIU when a snapshot take function is requested;

(d4-8) sending said saved state data to said trainer system when a snapshot upload function is requested;

(d4-9) receiving said state data from said trainer system and updating said saved state data when a snapshot download function is requested; and (d4-10) repeating said saved state data and sending said saved state data to said CDNU/OFP and said trainer system when a snapshot recall function is requested.

10. The external method as recited in claim 2 wherein when said CTIU provides a capability for said trainer system to command a snapshot to store specific conditions for later use, the step (d) further comprises the steps of:

(d4-1) starting a snapshot function when said CTIU receives Message SIM 06-CDNUBC, Simulator Functions Wordstring, from said trainer system;

(d4-2) determining whether a Checksum of a snapshot command message is valid;

(d4-3) ignoring said snapshot command message when said Checksum is not valid;

(d4-4) confirming a Snapshot function through Message CDNUBC-SIM 07, when said Checksum is valid, and said CDNU/OFP is in a Communications mode;

(d4-5) confirming said Snapshot function through Message CDNUBC-SIM 08, when said CDNU/OFP is in a RNAV mode;

(d4-6) confirming said Snapshot function through Message CDNUBC-SIM 11, Display Systems, and/or Message CDNUBC-SIM 15, when said CDNU/OFP is in a FMS mode;

(d4-7) taking and saving all state data to a CTIU computer of said CTIU when a snapshot take function is requested;

(d4-8) sending said saved state data to said trainer system when a snapshot upload function is requested;

(d4-9) receiving said state data from said trainer system and updating said saved state data when a snapshot download function is requested; and (d4-10) repeating said saved state data and sending said saved state data to said CDNU/OFP and said trainer system when a snapshot recall function is requested.

11. The external method as recited in claim 3 wherein when said CTIU provides a capability for said trainer system to command a snapshot to store specific conditions for later use, the step (d) further comprises the steps of:

(d4-1) starting a snapshot function when said CTIU receives Message SIM 06-CDNUBC, Simulator Functions Wordstring, from said trainer system;

(d4-2) determining whether a Checksum of a snapshot command message is valid;

(d4-3) ignoring said snapshot command message when said Checksum is not valid;

(d4-4) confirming a Snapshot function through Message CDNUBC-SIM 07, when said Checksum is valid, and said CDNU/OFP is in a Communications mode;

(d4-5) confirming said Snapshot function through Message CDNUBC-SIM 08, when said CDNU/OFP is in a RNAV mode;

(d4-6) confirming said Snapshot function through Message CDNUBC-SIM 11, Display Systems, and/or Message CDNUBC-SIM 15, when said CDNU/OFP is in a FMS mode;

(d4-7) taking and saving all state data to a CTIU computer of said CTIU when a snapshot take function is requested;

(d4-8) sending said saved state data to said trainer system when a snapshot upload function is requested;

(d4-9) receiving said state data from said trainer system and updating said saved state data when a snapshot download function is requested; and (d4-10) repeating said saved state data and sending said saved state data to said CDNU/OFP and said trainer system when a snapshot recall function is requested.

12. The external method as recited in claim 4 wherein when said CTIU provides a capability for said trainer system to command a snapshot to store specific conditions for later use, the step (d) further comprises the steps of:

(d4-1) starting a snapshot function when said CTIU receives Message SIM 06-CDNUBC, Simulator Functions Wordstring, from said trainer system;

(d4-2) determining whether a Checksum of a snapshot command message is valid;

(d4-3) ignoring said snapshot command message when said Checksum is not valid;

(d4-4) confirming a Snapshot function through Message CDNUBC-SIM 07, when said Checksum is valid, and said CDNU/OFP is in a Communications mode;

(d4-5) confirming said Snapshot function through Message CDNUBC-SIM 08, when said CDNU/OFP is in a RNAV mode;

(d4-6) confirming said Snapshot function through Message CDNUBC-SIM 11, Display Systems, and/or Message CDNUBC-SIM 15, when said CDNU/OFP is in a FMS mode;

(d4-7) taking and saving all state data to a CTIU computer of said CTIU when a snapshot take function is requested;

(d4-8) sending said saved state data to said trainer system when a snapshot upload function is requested;

(d4-9) receiving said state data from said trainer system and updating said saved state data when a snapshot download function is requested; and (d4-10) repeating said saved state data and sending said saved state data to said CDNU/OFP and said trainer system when a snapshot recall function is requested.

13. The external method as recited in claim 5 wherein when said CTIU provides a capability for said trainer system to command a snapshot to store specific conditions for later use, the step (d) further comprises the steps of:

(d4-1) starting a snapshot function when said CTIU receives Message SIM 06-CDNUBC, Simulator Functions Wordstring, from said trainer system;

(d4-2) determining whether a Checksum of a snapshot command message is valid;

(d4-3) ignoring said snapshot command message when said Checksum is not valid;

(d4-4) confirming a Snapshot function through Message CDNUBC-SIM 07, when said Checksum is valid, and said CDNU/OFP is in a Communications mode;

(d4-5) confirming said Snapshot function through Message CDNUBC-SIM 08, when said CDNU/OFP is in a RNAV mode;

(d4-6) confirming said Snapshot function through Message CDNUBC-SIM 11, Display Systems, and/or Message CDNUBC-SIM 15, when said CDNU/OFP is in a FMS mode;

(d4-7) taking and saving all state data to a CTIU computer of said CTIU when a snapshot take function is requested;

(d4-8) sending said saved state data to said trainer system when a snapshot upload function is requested;

(d4-9) receiving said state data from said trainer system and updating said saved state data when a snapshot download function is requested; and (d4-10) repeating said saved state data and sending said saved state data to said CDNU/OFP and said trainer system when a snapshot recall function is requested.

14. The external method as recited in claim 6 wherein when said CTIU provides a capability for said trainer system to command a snapshot to store specific conditions for later use, the step (d) further comprises the steps of:

(d4-1) starting a snapshot function when said CTIU receives Message SIM 06-CDNUBC, Simulator Functions Wordstring, from said trainer system;

(d4-2) determining whether a Checksum of a snapshot command message is valid;

(d4-3) ignoring said snapshot command message when said Checksum is not valid;

(d4-4) confirming a Snapshot function through Message CDNUBC-S1M 07, when said Checksum is valid, and said CDNU/OFP is in a Communications mode;

(d4-5) confirming said Snapshot function through Message CDNUBC-SIM 08, when said CDNU/OFP is in a RNAV mode;

(d4-6) confirming said Snapshot function through Message CDNUBC-SIM 11, Display Systems, and/or Message CDNUBC-SIM 15, when said CDNU/OFP is in a FMS mode;

(d4-7) taking and saving all state data to a CTIU computer of said CTIU when a snapshot take function is requested;

(d4-8) sending said saved state data to said trainer system when a snapshot upload function is requested;

(d4-9) receiving said state data from said trainer system and updating said saved state data when a snapshot download function is requested; and (d4-10) repeating said saved state data and sending said saved state data to said CDNU/OFP and said trainer system when a snapshot recall function is requested.

15. The external method as recited in claim 7 wherein when said CTIU provides a capability for said trainer system to command a snapshot to store specific conditions for later use, the step (d) further comprises the steps of:

(d4-1) starting a snapshot function when said CTIU receives Message SIM 06-CDNUBC, Simulator Functions Wordstring, from said trainer system;

(d4-2) determining whether a Checksum of a snapshot command message is valid;

(d4-3) ignoring said snapshot command message when said Checksum is not valid;

(d4-4) confirming a Snapshot function through Message CDNUBC-SIM 07, when said Checksum is valid, and said CDNU/OFP is in a Communications mode;

(d4-5) confirming said Snapshot function through Message CDNUBC-SIM 08, when said CDNU/OFP is in a RNAV mode;

(d4-6) confirming said Snapshot function through Message CDNUBC-SIM 11, Display Systems, and/or Message CDNUBC-SIM 15, when said CDNU/OFP is in a FMS mode;

(d4-7) taking and saving all state data to a CTIU computer of said CTIU when a snapshot take function is requested;

(d4-8) sending said saved state data to said trainer system when a snapshot upload function is requested;

(d4-9) receiving said state data from said trainer system and updating said saved state data when a snapshot download function is requested; and (d4-10) repeating said saved state data and sending said saved state data to said CDNU/OFP and said trainer system when a snapshot recall function is requested.

16. The external method as recited in claim 8 wherein when said CTIU provides a capability for said trainer system to command a snapshot to store specific conditions for later use, the step (d) further comprises the steps of:

(d4-1) starting a snapshot function when said CTIU receives Message SWM 06-CDNUBC, Simulator Functions Wordstring, from said trainer system;

(d4-2) determining whether a Checksum of a snapshot command message is valid;

(d4-3) ignoring said snapshot command message when said Checksum is not valid;

(d4-4) confirming a Snapshot function through Message CDNUBC-SIM 07, when said Checksum is valid, and said CDNU/OFP is in a Communications mode;

(d4-5) confirming said Snapshot function through Message CDNNUBC-SIM 08, when said CDNU/OFP is in a RNAV mode;

(d4-6) confirming said Snapshot function through Message CDNUBC-SIM 11, Display Systems, and/or Message CDNUBC-SIM 15, when said CDNU/OFP is in a FMS mode;

(d4-7) taking and saving all state data to a CTIU computer of said CTIU when a snapshot take function is requested;

(d4-8) sending said saved state data to said trainer system when a snapshot upload function is requested;

(d4-9) receiving said state data from said trainer system and updating said saved state data when a snapshot download function is requested; and (d4-10) repeating said saved state data and sending said saved state data to said CDNU/OFP and said trainer system when a snapshot recall function is requested.

17. The external method as recited in claim 1 wherein when said CTIU provides said trainer system an internally updated aircraft position thereof in order to allow a Trainer OTP to synchronize a CDNU calculated position with a trainer system calculated position, the step (d) further comprises the steps of:

(d5-1) taking position data from said CDNU/OFP when a Present Position Reporting is requested by said trainer system;

(d5-2) sending said position data to said trainer system by Message CDNUBC-TEST01 at a 1 Hz rate; and (d5-3) commanding said trainer system to update a calculated position to said received position data.

18. The external method as recited in claim 2 wherein when said CTIU provides said trainer system an internally updated aircraft position thereof in order to allow a Trainer OTP to synchronize a CDNU calculated position with a trainer system calculated position, the step (d) further comprises the steps of:

(d5-1) taking position data from said CDNU/OFP when a Present Position Reporting is requested by said trainer system;

(d5-2) sending said position data to said trainer system by Message CDNUBC-TEST01 at a 1 Hz rate; and (d5-3) commanding said trainer system to update a calculated position to said received position data.

19. The external method as recited in claim 3 wherein when said CTIU provides said trainer system an internally updated aircraft position thereof in order to allow a Trainer OTP to synchronize a CDNU calculated position with a trainer system calculated position, the step (d) further comprises the steps of:

(d5-1) taking position data from said CDNU/OFP when a Present Position Reporting is requested by said trainer system;

(d5-2) sending said position data to said trainer system by Message CDNUBC-TEST01 at a 1 Hz rate; and (d5-3) commanding said trainer system to update a calculated position to said received position data.

20. The external method as recited in claim 4 wherein when said CTIU provides said trainer system an internally updated aircraft position thereof in order to allow a Trainer OTP to synchronize a CDNU calculated position with a trainer system calculated position, the step (d) further comprises the steps of:

(d5-1) taking position data from said CDNU/OFP when a Present Position Reporting is requested by said trainer system;

(d5-2) sending said position data to said trainer system by Message CDNUBC-TEST01 at a 1 Hz rate; and (d5-3) commanding said trainer system to update a calculated position to said received position data.

21. The external method as recited in claim 5 wherein when said CTIU provides said trainer system an internally updated aircraft position thereof in order to allow a Trainer OTP to synchronize a CDNU calculated position with a trainer system calculated position, the step (d) further comprises the steps of:

(d5-1) taking position data from said CDNU/OFP when a Present Position Reporting is requested by said trainer system;

(d5-2) sending said position data to said trainer system by Message CDNUBC-TEST01 at a 1 Hz rate; and (d5-3) commanding said trainer system to update a calculated position to said received position data.

22. The external method as recited in claim 8 wherein when said CTIU provides said trainer system an internally updated aircraft position thereof in order to allow a Trainer OTP to synchronize a CDNU calculated position with a trainer system calculated position, the step (d) further comprises the steps of:

(d5-1) taking position data from said CDNU/OFP when a Present Position Reporting is requested by said trainer system;

(d5-2) sending said position data to said trainer system by Message CDNUBC-TEST01 at a 1 Hz rate; and (d5-3) commanding said trainer system to update a calculated position to said received position data.

23. The external method as recited in claim 9 wherein when said CTIU provides said trainer system an internally updated aircraft position thereof in order to allow a Trainer OTP to synchronize a CDNU calculated position with a trainer system calculated position, the step (d) further comprises the steps of:

(d5-1) taking position data from said CDNU/OFP when a Present Position Reporting is requested by said trainer system;

(d5-2) sending said position data to said trainer system by Message CDNUBC-TEST01 at a 1 Hz rate; and (d5-3) commanding said trainer system to update a calculated position to said received position data.

24. The external method as recited in claim 16 wherein when said CTIU provides said trainer system an internally updated aircraft position thereof in order to allow a Trainer OTP to synchronize a CDNU calculated position with a trainer system calculated position, the step (d) further comprises the steps of:

(d5-1) taking position data from said CDNU/OFP when a Present Position Reporting is requested by said trainer system;

(d5-2) sending said position data to said trainer system by Message CDNUBC-TEST01 at a 1 Hz rate; and (d5-3) commanding said trainer system to update a calculated position to said received position data.

25. A CDNU trainer interface unit (CTIU) which is connected between a Control Display Navigation Unit loaded with an Operational Flight Program (CDNU/OFP) and a trainer system for controlling message transmission between said CDNU/OFP and said trainer system, wherein said CTIU comprises:

a computer having a first multiplex data bus interface board and a second multiplex data bus interface board;

a first multiplex data bus connected between said CDNU/OFP and said first multiplex data bus board of said computer; and a second multiplex data bus connected between said trainer system and said second multiplex data bus board of said computer;

wherein during a non-training-specific mode, said computer relays messages transmitted between said CDNU/OFP and said trainer system, and that during trainer-unique functions, said computer communicates with said CDNU/OFP via said first multiplex data bus by OFP-defined messages and with said trainer system via said second multiplex data bus by OTP-defined messages.

26. The CTIU as recited in claim 25 wherein each of said first and second multiplex data buses is a MIL-STD-1553B bus.

27. The CTIU as recited in claim 25 wherein during said trainer-unique functions, said OFP-defined messages are also used by said CTIU to collect data from said CDNU/OFP.

28. The CTIU as recited in claim 26 wherein during said trainer-unique functions, said OFP-defined messages are also used by said CTIU to collect data from said CDNU/OFP.

29. The CTIU as recited in claim 27 further comprising an ARINC-429 bus interface for collecting data from CDNU/OFP.

30. The CTIU as recited in claim 28 further comprising an ARINC-429 bus interface for collecting data from CDNU/OFP.

31. The CTIU as recited in claim 28 wherein Non volatile Memory (NVM) data contain some CDNU status data required during execution of said trainer-unique functions, said NVM stored data including flight plan, routes, waypoints, targets, pattern parameters, communication frequencies, presets, call signs, NAV operating modes, TACAN parameters, and active page display parameters.

32. The CTIU as recited in claim 25 wherein said OTP-defined messages are analyzed to define a proper operation for said CTIU during said trainer-unique functions, and said OFP messages are used for a CDNU BC and a CDNU RT data transmission to collect CDNU status and data in real-time.

33. The CTIU as recited in claim 28 wherein said OTP-defined messages are analyzed to define a proper operation for said CTIU during said trainer-unique functions, and said OFP messages are used for a CDNU BC and a CDNU RT data transmission to collect CDNU status and data in real-time.

34. The CTIU as recited in claim 25 wherein said computer is an open standard bus computer forming a computation platform for said CTIU and comprises:

an open standard bus chassis adapted to accommodate open standard bus modules, wherein said open standard bus chassis comprises an open standard bus backplane to connect an open standard bus modules together, an enclosure to provide a mechanical frame, and a power supply;

a microprocessor module which is a core of said open standard bus computer for carrying out CTIU data transmission and processing;

a EPROM memory module, which is an open standard bus Flash EEPROM memory board provides non-volatile storage for said open standard bus computer, for storing an operating program code and data collected by a Bus Monitor of said CTIU;

a ARINC-429 interface module which is used to collect require data for said CTIU for use during said trainer-unique functions; and a digital I/O port module which is used to receive discrete signals from said CDNU/OFP and said trainer system for determining whether said trainer system requests said trainer-unique functions.

35. The CTIU as recited in claim 34 wherein said computer further comprises a serial port which is used to communicate with a PC console.

36. The CTIU as recited in claim 34 wherein said computer further comprises a network controller which is used to connect said CTIU to testing devices during a system development and test phase and to a simulation host computer during training operation.

37. The CTIU as recited in claim 35 wherein said computer further comprises a network controller which is used to connect said CTIU to testing devices during a system development and test phase and to a simulation host computer during training operation.

38. The CTIU as recited in claim 26 wherein said computer is an open standard bus computer forming a computation platform for said CTIU and comprises:

an open standard bus chassis adapted to accommodate open standard bus modules, wherein said open standard bus chassis comprises an open standard bus backplane to connect an open standard bus modules together, an enclosure to provide a mechanical frame, and a power supply;

a microprocessor module which is a core of said open standard bus computer for carrying out CTIU data transmission and processing;

a EPROM memory module, which is an open standard bus Flash EEPROM memory board provides non-volatile storage for said open standard bus computer, for storing an operating program code and data collected by a Bus Monitor of said CTIU;

a ARINC-429 interface module which is used to collect require data for said CTIU for use during said trainer-unique functions; and a digital I/O port module which is used to receive discrete signals from said CDNU/OFP and said trainer system for determining whether said trainer system requests said trainer-unique functions.

39. The CTIU as recited in claim 38 wherein said computer further comprises a serial port which is used to communicate with a PC console.

40. The CTIU as recited in claim 38 wherein said computer further comprises a network controller which is used to connect said CTIU to testing devices during a system development and test phase and to a simulation host computer during training operation.

41. The CTIU as recited in claim 39 wherein said computer further comprises a network controller which is used to connect said CTIU to testing devices during a system development and test phase and to a simulation host computer during training operation.

42. The CTIU as recited in claim 27 wherein said computer is an open standard bus computer forming a computation platform for said CTIU and comprises:

an open standard bus chassis adapted to accommodate open standard bus modules, wherein said open standard bus chassis comprises an open standard bus backplane to connect an open standard bus modules together, an enclosure to provide a mechanical frame, and a power supply;

a microprocessor module which is a core of said open standard bus computer for carrying out CTIU data transmission and processing;

a EPROM memory module, which is an open standard bus Flash EEPROM memory board provides non-volatile storage for said open standard bus computer, for storing an operating program code and data collected by a Bus Monitor of said CTIU;

a ARINC-429 interface module which is used to collect require data for said CTIU for use during said trainer-unique functions; and a digital I/O port module which is used to receive discrete signals from said CDNU/OFP and said trainer system for determining whether said trainer system requests said trainer-unique functions.

43. The CTIU as recited in claim 42 wherein said computer further comprises a serial port which is used to communicate with a PC console.

44. The CTIU as recited in claim 42 wherein said computer further comprises a network controller which is used to connect said CTIU to testing devices during a system development and test phase and to a simulation host computer during training operation.

45. The CTIU as recited in claim 43 wherein said computer further comprises a network controller which is used to connect said CTIU to testing devices during a system development and test phase and to a simulation host computer during training operation.

46. The CTIU as recited in claim 28 wherein said computer is an open standard bus computer forming a computation platform for said CTIU and comprises:

an open standard bus chassis adapted to accommodate open standard bus modules, wherein said open standard bus chassis comprises an open standard bus backplane to connect an open standard bus modules together, an enclosure to provide a mechanical frame, and a power supply;

a microprocessor module which is a core of said open standard bus computer for carrying out CTIU data transmission and processing;

a EPROM memory module, which is an open standard bus Flash EEPROM memory board provides non-volatile storage for said open standard bus computer, for storing an operating program code and data collected by a Bus Monitor of said CTIU, a ARINC-429 interface module which is used to collect require data for said CTIU for use during said trainer-unique functions; and a digital I/O port module which is used to receive discrete signals from said CDNU/OFP and said trainer system for determining whether said trainer system requests said trainer-unique functions.

47. The CTIU as recited in claim 46 wherein said computer further comprises a serial port which is used to communicate with a PC console.

48. The CTIU as recited in claim 46 wherein said computer further comprises a network controller which is used to connect said CTIU to testing devices during a system development and test phase and to a simulation host computer during training operation.

49. The CTIU as recited in claim 47 wherein said computer further comprises a network controller which is used to connect said CTIU to testing devices during a system development and test phase and to a simulation host computer during training operation.

50. The CTIU as recited in claim 30 wherein said computer is an open standard bus computer forming a computation platform for said CTIU and comprises:

- an open standard bus chassis adapted to accommodate open standard bus modules, wherein said open standard bus chassis comprises an open standard bus backplane to connect an open standard bus modules together, an enclosure to provide a mechanical frame, and a power supply;
- a microprocessor module which is a core of said open standard bus computer for carrying out CTIU data transmission and processing;
- a EPROM memory module, which is an open standard bus Flash EEPROM memory board provides non-volatile storage for said open standard bus computer, for storing an operating program code and data collected by a Bus Monitor of said CTIU;
- a ARINC-429 interface module which is used to collect require data from said ARINC-429 bus interface for said CTIU for use during said trainer-unique functions; and
- a digital I/O port module which is used to receive discrete signals from said CDNU/OFP and said trainer system for determining whether said trainer system requests said trainer-unique functions.

51. The CTIU as recited in claim 50 wherein said computer further comprises a serial port which is used to communicate with a PC console.

52. The CTIU as recited in claim 50 wherein said computer further comprises a network controller which is used to connect said CTIU to testing devices during a system development and test phase and to a simulation host computer during training operation.

53. The CTIU as recited in claim 51 wherein said computer further comprises a network controller which is used to connect said CTIU to testing devices during a system development and test phase and to a simulation host computer during training operation.

* * * * *

UNITED STATES PATENT AND TRADEMARK OFFICE
CERTIFICATE OF CORRECTION

PATENT NO. : 6,478,581 B1
DATED : November 12, 2002
INVENTOR(S) : Ching-Fang Lin It is certified that error appears in the above-identified patent and that said Letters Patent is hereby corrected as shown below:

<u>Column 1,</u>
Line 9, after "Contract No. N61339-01-C-0005", insert
-- and Contract No. N00421-99-C-1061 --.

Signed and Sealed this

Fourth Day of March, 2003

Attest:

Attesting Officer

JAMES E. ROGAN
*Director of the United States Patent and Trademark Office*